(12) United States Patent
Kutter et al.

(10) Patent No.: US 6,655,146 B2
(45) Date of Patent: Dec. 2, 2003

(54) HYBRID FILM COOLED COMBUSTOR LINER

(75) Inventors: Ella Christine Kutter, Miamisburg, OH (US); Marwan Al-Roub, Cincinnati, OH (US); Thomas Anthony Leen, Cincinnati, OH (US); Daniel Dale Brown, Fairfield, OH (US); Craig Douglas Young, Maineville, OH (US); Gilbert Farmer, Cincinnati, OH (US); Mohammad Ehteshami, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/919,028

(22) Filed: Jul. 31, 2001

(65) Prior Publication Data

US 2003/0027093 A1 Feb. 6, 2003

(51) Int. Cl.⁷ .................................................. F23R 3/06
(52) U.S. Cl. ............................ 60/752; 60/754; 60/755; 60/757
(58) Field of Search .......................... 60/754, 752, 755, 60/756, 757

(56) References Cited

U.S. PATENT DOCUMENTS

| | | | | | |
|---|---|---|---|---|---|
| 2,657,531 A | * | 11/1953 | Pierce | ......................... | 60/758 |
| 3,169,369 A | * | 2/1965 | Holl | ............................ | 60/757 |
| 4,151,713 A | * | 5/1979 | Faitani et al. | ................. | 60/757 |
| 4,242,871 A | * | 1/1981 | Breton | ......................... | 60/757 |
| 4,566,280 A | * | 1/1986 | Burr | ............................. | 60/754 |
| 4,896,510 A | * | 1/1990 | Foltz | ........................... | 60/757 |
| 5,209,067 A | * | 5/1993 | Barbier et al. | ................. | 60/757 |
| 5,279,127 A | * | 1/1994 | Napoli | ........................ | 60/754 |
| 5,307,637 A | * | 5/1994 | Stickles et al. | ............... | 60/756 |
| 5,483,794 A | * | 1/1996 | Nicoll et al. | .................. | 60/757 |
| 5,974,805 A | * | 11/1999 | Allen | ........................... | 60/756 |
| 6,101,814 A | * | 8/2000 | Hoke et al. | ................... | 60/757 |
| 6,286,317 B1 | * | 9/2001 | Burrus et al. | ................. | 60/750 |
| 6,389,815 B1 | * | 5/2002 | Hura et al. | .................... | 60/746 |
| 6,438,958 B1 | * | 8/2002 | McCaffrey et al. | ........... | 60/752 |

* cited by examiner

*Primary Examiner*—Ted Kim
(74) *Attorney, Agent, or Firm*—William Scott Andes; Pierce Atwood

(57) ABSTRACT

A combustor liner has an annular shell which includes a first portion and a second portion. The first portion is provided with slot film cooling and the second portion is provided with multi-hole film cooling. The multi-hole cooling portion can be located either forward or aft of the slot film cooling portion, depending on the nature of the combustor that the liner is to be used in. In one possible embodiment, the liner includes a first annular panel, a second annular panel section joined at its forward end to the aft end of the first panel section, and a third annular panel section being joined at its forward end to the aft end of the second panel section. At least one of the panel sections has multi-hole film cooling and at least one other of the panel sections has slot film cooling.

8 Claims, 4 Drawing Sheets

HYBRID FILM COOLED COMBUSTOR LINER

BACKGROUND OF THE INVENTION

This invention relates generally to gas turbine engines and more particularly to film cooled combustor liners used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Combustors used in aircraft engines typically include inner and outer combustor liners that contain the combustion process and facilitate the distribution of air to the various combustor zones. The combustor liners are joined at their upstream ends to a dome assembly. The dome assembly includes an annular dome plate and a plurality of circumferentially spaced swirler assemblies mounted therein for introducing the fuel/air mixture to the combustion chamber. The liners facilitate air distribution by way of a number of dilution holes formed therein. The dilution holes introduce jets of air to primary and secondary zones of the combustion chamber. The dilution air quenches the flames so as to control the gas temperature to which the turbine hardware downstream of the combustor will be exposed. The quenching also reduces the level of $NO_x$ emissions in the engine exhaust.

Because they are exposed to intense heat generated by the combustion process, combustor liners are cooled to meet life expectancy requirements. Liner cooling is commonly provided by diverting a portion of the compressed air (which is relatively cool) and causing it to flow over the outer surfaces of the liners. In addition, a thin layer or film of cooling air is provided along the combustion side of the liners by directing cooling air flow through cooling holes formed in the liners. This technique, referred to as film cooling, reduces the overall thermal load on the liners because the mass flow through the cooling holes dilutes the hot combustion gas next to the liner surfaces, and the film of cooling air provides convective cooling of the liner walls. There are two basic types of liners that employ film cooling: multi-hole cooled liners and slot cooled liners.

Multi-hole cooled liners use a large number of very small cooling holes formed through the liners at a shallow angle (typically 20 degrees from the liner surface). Compressor air passes through the cooling holes to create closely packed, discrete jets of cooling air that coalesce and produce the film of cooling air on the combustion side of the liners. The cooling holes are generally distributed over the whole liner so as to provide a constant replenishing of the cooling film along the entire length of the liner. Slot cooled liners include a plurality of connected panel sections with a bump or nugget formed on the forward end of each panel section. An axially oriented slot is formed on the hot gas side surface of each panel section at the nugget, and a circumferentially disposed row of cooling holes is formed in the nugget. Compressor air passes through the cooling holes to produce the film of cooling air on the hot gas side surface of the panel section. Thus, the cooling film is replenished at each slot.

With either cooling approach, the difficulty in developing a successful liner design results from making appropriate thermal design trade offs between substrate temperature, surface temperature of and thermal barrier coating (TBC), bondcoat temperature, and thermal gradient through the TBC. Inadequate cooling can result in reduced low cycle fatigue life, increased oxidation rates of the TBC bondcoat and substrate, spallation of the TBC, and accelerated creep of the slot overhangs. Material selection and cross-sectional thickness (and hence weight) are also considered in designing liners. A multi-hole cooled liner typically requires a stronger substrate alloy or a thicker design, while a slot cooled liner benefits from the stiffening effect of the slot nuggets. However, the overall weight of a slot cooled liner is typically greater. It is also desirable to minimize the amount of cooling air needed for a liner design to increase engine efficiency and reduce emissions.

Both multi-hole cooled liners and slot cooled liners have proven to be effective for various applications. Multi-hole film cooling is particularly effective in continuous replenishment of an existing film and provides the added benefit of bore cooling of the liner substrate. However, cooling film volume is constrained by the spacing and size of the cooling holes. Slot film cooling is particularly effective in providing high volume cooling films in specific regions without being constrained by the hole size limitations of multi-hole film cooling. Historically, multi-hole film cooling uses less air to obtain acceptable substrate temperatures but is not as effective in cooling TBCs as slot film cooling. In addition, slot cooled liners tend to be more expensive and weigh more than comparable multi-hole cooled liners.

Regardless of the cooling approach, liners tend to develop hot spots or regions during operation. Different liner designs develop hot spots in different locations. Where hot spots occur can be a function of many factors including the configuration of the liners, dome assemblies and swirlers. For instance, the swirl of the combustion flow induced by the swirlers can cause hot gases to impinge against distinct regions of the liner surfaces. These regions tend to experience a loss of cooling film effectiveness and thus be more susceptible to thermal degradation. This effect, which is usually referred to as cooling film scrubbing, often occurs in the primary reaction zone of a combustor, although it can occur in other areas as well.

Hot spots are typically dealt with by providing sufficient total air flow to adequately cool the liner areas that would otherwise be susceptible to hot spots. However, this approach overcools non-problem areas, wasting cooling air and impairing engine efficiency. Accordingly, it would be desirable to have a combustor liner cooling scheme that adequately and efficiently cools all parts of the liner.

BRIEF SUMMARY OF THE INVENTION

The above-mentioned need is met by the present invention, which provides a combustor liner having an annular shell which includes a first portion and a second portion. The first portion is provided with slot film cooling and the second portion is provided with multi-hole film cooling. The multi-hole cooling portion can be located either forward or aft of the slot film cooling portion, depending on the nature of the combustor that the liner is to be used in. In one possible embodiment, the liner includes a first annular panel, a second annular panel section joined at its forward end to the aft end of the first panel section, and a third annular panel section being joined at its forward end to the aft end of the second panel section. At least one of the panel sections has multi-hole film cooling and at least one other of the panel sections has slot film cooling.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
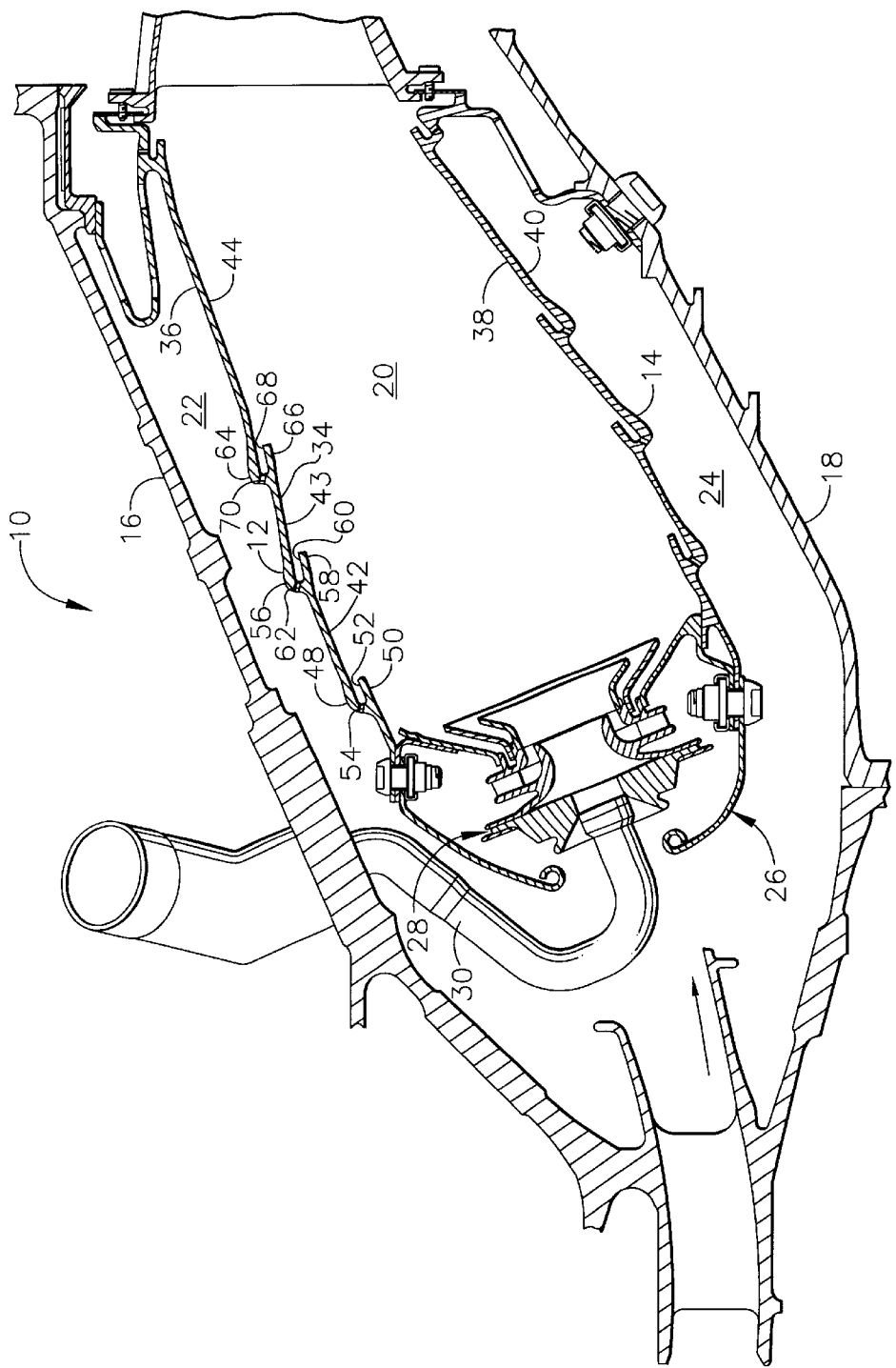
FIG. 1 is a longitudinal sectional view of a gas turbine combustor having a first embodiment of a hybrid film cooled combustor liner.

Referring to the drawings wherein identical reference numerals denote the same elements throughout the various views, FIG. 1 shows a combustor 10 of the type suitable for use in a gas turbine engine. The combustor 10 includes an annular outer liner 12 and an annular inner liner 14 disposed between an outer combustor casing 16 and an inner combustor casing 18. The outer and inner liners 12 and 14 are radially spaced from each other to define a combustion chamber 20. The outer liner 12 and the outer casing 16 form an outer passage 22 therebetween, and the inner liner 14 and the inner casing 18 form an inner passage 24 therebetween. As is known in the art, compressed air is supplied from a compressor (not shown) located upstream of the combustor 10. The compressed air passes principally into the combustor 10 to support combustion and partially into the outer and inner passages 22 and 24 where it is used to cool the liners 12 and 14 and turbomachinery further downstream.

A dome assembly 26 mounted at the upstream ends of the outer and inner liners 12 and 14 supports a plurality of circumferentially spaced swirler assemblies 28 (only one shown in FIG. 1). Each swirler assembly 28 receives compressed air from the compressor and fuel from a corresponding fuel nozzle 30. The fuel and air are swirled and mixed by the swirler assemblies 28, and the resulting fuel/air mixture is discharged into the combustion chamber 20. The fuel/air mixture is ignited by one or more igniters (not shown) that are disposed around the circumference of the outer liner 12. It is noted that although FIG. 1 illustrates one possible embodiment of a single annular combustor, the present invention is equally applicable to other types of combustors, including double annular combustors.

The outer and inner liners 12 and 14 each comprise a metal shell having a generally annular and axially extending configuration. The outer liner 12 has a hot side 34 facing the hot combustion gases in the combustion chamber 20 and a cold side 36 in contact with the relatively cool air in the outer passage 22. Similarly, the inner liner 14 has a hot side 38 facing the hot combustion gases in the combustion chamber 20 and a cold side 40 in contact with the relatively cool air in the inner passage 24. As is known in the art, the hot sides 34, 38 can be provided with a thermal barrier coating (TBC).

The outer liner 12 includes a first panel section 42, a second panel section 43, and a third panel section 44. The panel sections 42–44 can be an integrally formed, machined forging or separate pieces of sheet metal joined together by a joining method such as brazing or welding. Each section 42–44 has a substantially annular configuration. The third panel section 44 can be, but is not necessarily, axially longer than either of the first and second panel sections 42, 43. It should be noted that the present invention is not limited to such a three-panel configuration, which is just described here by way of example. Indeed, the present invention is applicable to liners having different numbers of panels.

The first panel section 42 has a first cooling nugget 48 formed at the forward end thereof. The first cooling nugget 48 includes an annular lip 50 formed thereon and spaced radially inward so as to define a cooling slot 52. A row of cooling holes 54 (only one shown in FIG. 1) is formed in the first cooling nugget 48 to feed cooling air to the first cooling slot 52. The first cooling slot 52 is oriented in a substantially axial direction so that cooling air is directed downstream and forms a thin cooling film on the hot side of the first panel section 42. The first cooling holes 54 are distributed about the entire circumference of the cooling nugget 48.

The second panel section 43 is joined at its forward end to the aft end of the first panel section 42. A second cooling nugget 56 is formed at the forward end of the second panel section 43. The second cooling nugget 56 includes an annular lip 58 formed thereon and spaced radially inward so as to define a cooling slot 60. A row of cooling holes 62 (only one shown in FIG. 1) is formed in the second cooling nugget 56 to feed cooling air to the second cooling slot 60. The second cooling slot 60 is oriented in a substantially axial direction so that cooling air is directed downstream and forms a thin cooling film on the hot side of the second panel section 43, thereby replenishing the cooling film from the first panel section 42. The cooling holes 62 are distributed about the entire circumference of the second cooling nugget 56.

Similarly, the third panel section 44 is joined at its forward end to the aft end of the second panel section 43. A third cooling nugget 64 is formed at the forward end of the third panel section 44. The third cooling nugget 64 includes an annular lip 66 formed thereon and spaced radially inward so as to define a cooling slot 68. A row of cooling holes 70 (only one shown in FIG. 1) is formed in the third cooling nugget 64 to feed cooling air to the third cooling slot 68. The third cooling slot 68 is oriented in a substantially axial direction so that cooling air is directed downstream and forms a thin cooling film on the hot side of the third panel section 44, thereby replenishing the cooling film of the second panel section 43. The third cooling holes 70 are distributed about the entire circumference of the third cooling nugget 64.

The inner liner 14 also includes three panel sections joined together end-to-end and is similar in structure to the outer liner 12 except for having the hot side 38 formed on the radially outer surface instead of the radially inner surface. Consequently, the structure of the inner liner 14 need not be described in further detail. In addition, the cooling scheme of the inner liner 14 is substantially the same as that of the outer liner 12 and consequently is not described in detail here as the following description is essentially applicable to both liners.

Figure 2:
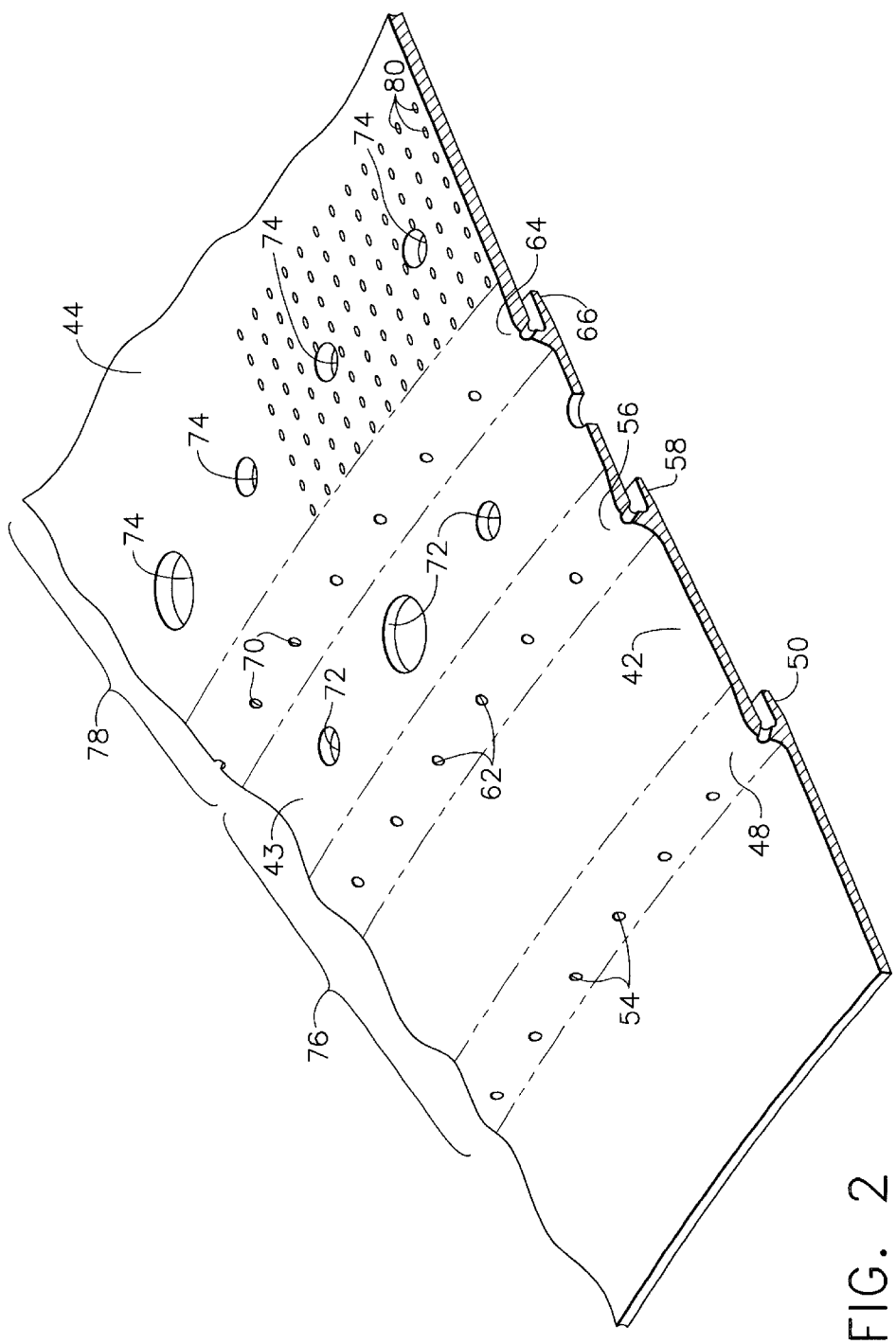
FIG. 2 is a fragmentary perspective view of a portion of the combustor liner of FIG. 1.

Turning now to FIG. 2, a portion of the outer liner 12 is shown in detail. A first group of circumferentially spaced dilution holes 72, referred to as the primary dilution holes, is formed in the second panel section 43 at a first axial location, and a second group of circumferentially spaced dilution holes 74, referred to as the secondary dilution holes, is formed in the third panel section 44 at a second axial location. It should be noted that additional and/or other locations for dilution holes are possible. The dilution holes 72, 74 serve to admit dilution air into the combustor chamber 20 for enhancing the combustion process. Each dilution hole 72, 74 has a diameter that is substantially greater than the diameter of the cooling holes, although all of the dilution holes do not necessarily have the same diameter. That is, some dilution holes 72, 74 have a larger diameter than others do, as shown in FIG. 2. The relative axial locations of the primary and secondary dilution holes 72 and 74 define a primary reaction zone 76 and a secondary reaction zone 78 of the combustion chamber 20. That is, the primary reaction zone 76 corresponds to the portion of the combustion chamber 20 comprising the primary dilution holes 72 and forward. The secondary reaction zone 78 corresponds to the portion of the combustion chamber 20 located aft of the primary reaction zone 76.

The outer liner 12 has a cooling scheme in which slot film cooling is used in the primary reaction zone 76 and multi-hole film cooling is used in the secondary reaction zone 78. This, a forward portion of the outer liner 12 is provided with slot film cooling and an aft portion is provided with multi-hole film cooling. In particular, the third panel section 44 has an array of closely packed multi-hole cooling holes 80 formed therein. (Although FIG. 2 only shows a portion of the third panel section 44 having the cooling holes 80, it should be noted that the third panel section 44 will typically be essentially entirely covered with the multi-hole cooling holes 80.) The cooling holes 80 are axially slanted from cold side 36 to hot side 34 at a downstream angle, which is preferably, but not necessarily, in the range of about 15° to 20°. The first and second panel sections 42, 43 are not provided with any such multi-hole cooling holes, and are cooled by the cooling films produced by the cooling air discharged from the first and second cooling slots 52, 60, respectively. Thus, as used herein, "multi-hole film cooling" refers to the use of many multi-hole cooling holes to produce a cooling film on a surface to be cooled, and "slot film cooling" refers to the use a cooling nugget and slot formed at the forward end of a surface to be cooled to produce a cooling film on the surface without multi-hole cooling holes. The third cooling holes 70 function to provide a starter flow for the cooling film produced on the third panel section 44 by the multi-hole cooling holes 80.

The outer liner 12 is useful in combustors in which high surface temperatures occur in the primary reaction zone. Using slot film cooling in the primary reaction zone 76 provides robust film cooling of the TBC or surface in the region that is best cooled by the high volume slot film. Multi-hole film cooling is used in the secondary reaction zone 78 where TBC surface temperatures are generally lower and film volume can be reduced. Cooling air is conserved and liner substrate temperatures are made acceptable by the bore cooling of the multi-hole cooling holes 80. By combining slot film cooling and multi-hole film cooling in a single liner, the design can be optimized to minimize the cooling required to achieve acceptable part temperatures. In addition, this hybrid cooling design provides improved buckling resistance over multi-hole cooled liners without the full weight increase of a slot cooled liner.

While FIG. 2 shows the liner 12 having a cooling scheme in which slot film cooling is used in the primary reaction zone 76 and multi-hole film cooling is used in the secondary reaction zone 78, the present invention is not limited to this configuration. In general, the present invention includes any configuration in which slot film cooling is used in a first liner portion and multi-hole film cooling is used in a second liner portion.

Figure 3:
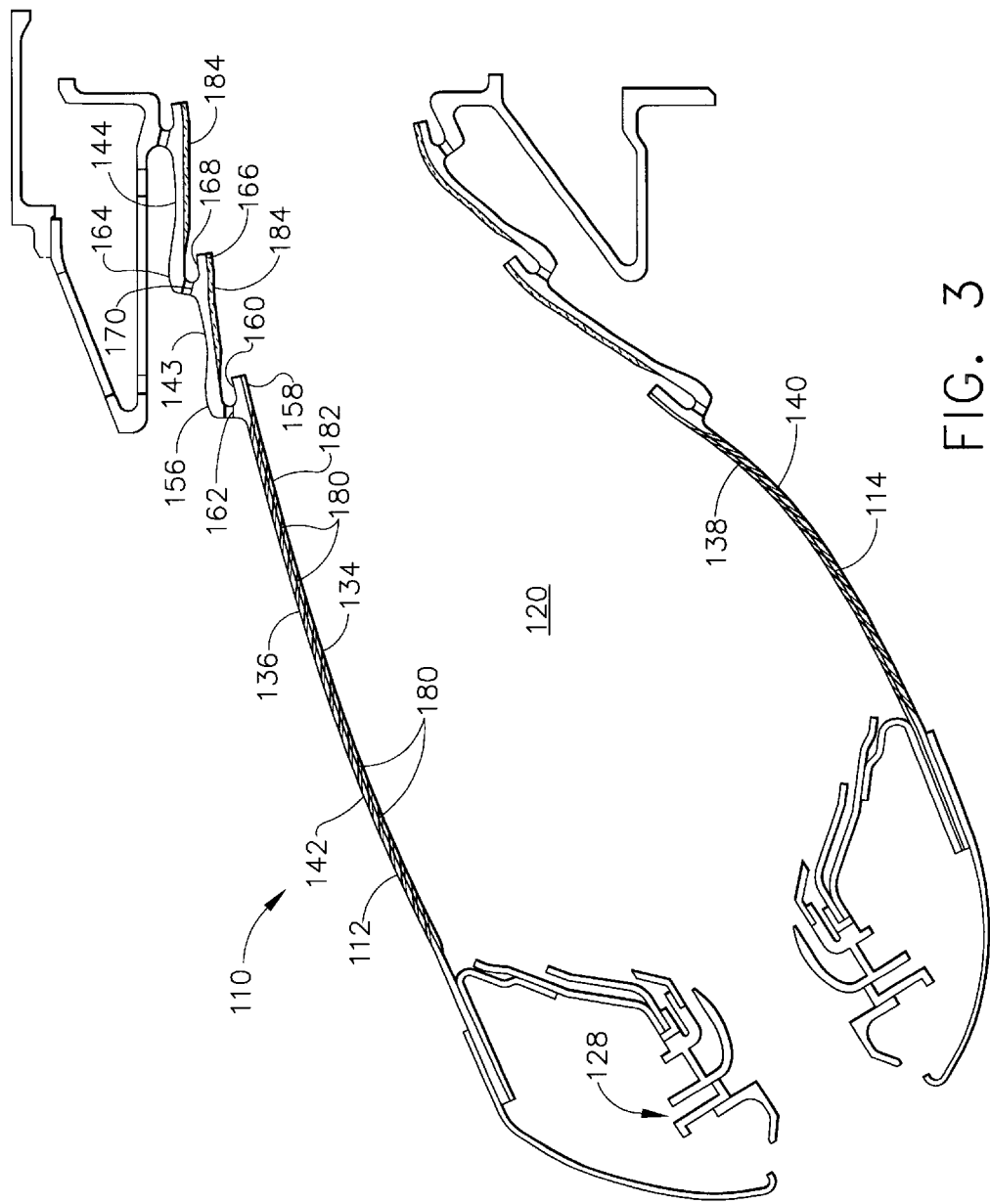
FIG. 3 is a longitudinal sectional view of a gas turbine combustor having a second embodiment of a hybrid film cooled combustor liner.

Cooling film scrubbing does not always occur in the primary reaction zone. For some combustor designs, cooling film scrubbing occurs further downstream in the combustor, thus making the aft portions of the liners more susceptible to a loss of cooling film effectiveness. FIG. 3 shows a second embodiment that is useful in such combustors.

Specifically, FIG. 3 shows a combustor 110 that includes an annular outer liner 112 and an annular inner liner 114 that are radially spaced from each other to define a combustion chamber 120. A dome assembly 126 mounted at the upstream ends of the outer and inner liners 112 and 114 supports a plurality of circumferentially spaced swirler assemblies 128 (only one shown in FIG. 3). Each swirler assembly 128 receives compressed air from the compressor and fuel from a corresponding fuel nozzle (not shown). The fuel and air are swirled and mixed by the swirler assemblies 128, and the resulting fuel/air mixture is discharged into the combustion chamber 120. The fuel/air mixture is ignited by one or more igniters (not shown) that are disposed around the circumference of the outer liner 112. It is noted that although FIG. 3 illustrates a single annular combustor, the present invention is equally applicable to other types of combustors.

The outer and inner liners 112 and 114 each comprise a metal shell having a generally annular and axially extending configuration. The outer liner 112 has a hot side 134 facing the hot combustion gases in the combustion chamber 120 and a cold side 136 in contact with relatively cool air. Similarly, the inner liner 114 has a hot side 138 facing the hot combustion gases in the combustion chamber 120 and a cold side 140 in contact with relatively cool air.

As in the first embodiment, the outer liner 112 includes a first panel section 142, a second panel section 143, and a third panel section 144, although it should be noted that the second embodiment is also not limited to such a three-panel configuration. The first panel section 142 is joined at its forward end to the dome assembly 126. The first panel section 142 can be, but is not necessarily, axially longer than either of the second and third panel sections 143, 144.

The second panel section 143 is joined at its forward end to the aft end of the first panel section 142. A cooling nugget 156 is formed at the forward end of the second panel section 143. The cooling nugget 156 includes an annular lip 158 formed thereon and spaced radially inward so as to define a cooling slot 160. A row of cooling holes 162 (only one shown in FIG. 3) is formed in the cooling nugget 156 to feed cooling air to the cooling slot 160. The cooling slot 160 is oriented in a substantially axial direction so that cooling air is directed downstream and forms a thin cooling film on the hot side of the second panel section 143, thereby replenishing the cooling film from the first panel section 142. The cooling holes 162 are distributed about the entire circumference of the cooling nugget 156.

Similarly, the third panel section 144 is joined at its forward end to the aft end of the second panel section 143. Another cooling nugget 164 is formed at the forward end of the third panel section 144. The cooling nugget 164 includes an annular lip 166 formed thereon and spaced radially inward so as to define a cooling slot 168. A row of cooling holes 170 (only one shown in FIG. 3) is formed in the cooling nugget 164 to feed cooling air to the cooling slot 168. The cooling slot 168 is oriented in a substantially axial direction so that cooling air is directed downstream and forms a thin cooling film on the hot side of the third panel section 144, thereby replenishing the cooling film of the second panel section 143. The cooling holes 170 are distributed about the entire circumference of the cooling nugget 164.

The inner liner 114 also includes three panel sections joined together end-to-end and is similar in structure to the outer liner 112 except for having the hot side 138 formed on the radially outer surface instead of the radially inner surface. Consequently, the structure of the inner liner 114 need not be described in further detail. In addition, the cooling scheme of the inner liner 114 is substantially the same as that of the outer liner 112 and consequently is not described in detail here as the following description is essentially applicable to both liners.

The outer liner 112 has a cooling scheme in which a forward portion thereof is provided with multi-hole film cooling and an aft portion is provided with slot film cooling. In particular, the first panel section 142 is covered with an array of closely packed multi-hole cooling holes 180 extending therethrough. The cooling holes 180 are axially slanted from cold side 136 to hot side 134 at a downstream angle, which is preferably, but not necessarily, in the range of about 15° to 20°. The second and third panel sections 143, 144 are not provided with any such multi-hole cooling holes, and are cooled by the cooling films produced by the cooling air discharged from the respective cooling slots 160, 168.

The liner 112 is provided with a first TBC 182 on the hot side of the first panel section 142 and a second TBC 184 on the hot sides of the second and third panel sections 143, 144. The second TBC 184 comprises a thick, dense, vertically microcracked (TDVM) TBC. TDVM TBCs are generally known in the art and will not be discussed in detail here. The first TBC 182 comprises the more common porous TBC. Thus, TDVM TBCs are used in conjunction with slot film cooling to reduce liner substrate temperatures in the hottest region of the combustor. The TDVM TBC provides additional thermal protection in the portion of the liner where the high volume slot film is used. Porous TBCs, which are typically less expensive, are used in conjunction with multi-hole film cooling.

With this configuration, slot film cooling is used in an aft portion of the liner 112 that is best cooled by the high volume slot film to provide robust film cooling of the TBC on second and third panel sections 143, 144. Multi-hole film cooling is used in a forward portion of the liner 112 where TBC surface temperatures are generally lower and film volume can be reduced. Cooling air is conserved and liner substrate temperatures are made acceptable by the bore cooling of the multi-hole cooling holes 180. The other advantages of combining slot film cooling and multi-hole film cooling in a single liner that are discussed above are also realized in the second embodiment. It should be noted that this is just one possible TBC arrangement. Any or all of the liner panel sections could have any type of TBC or no TBC at all.

Figure 4:
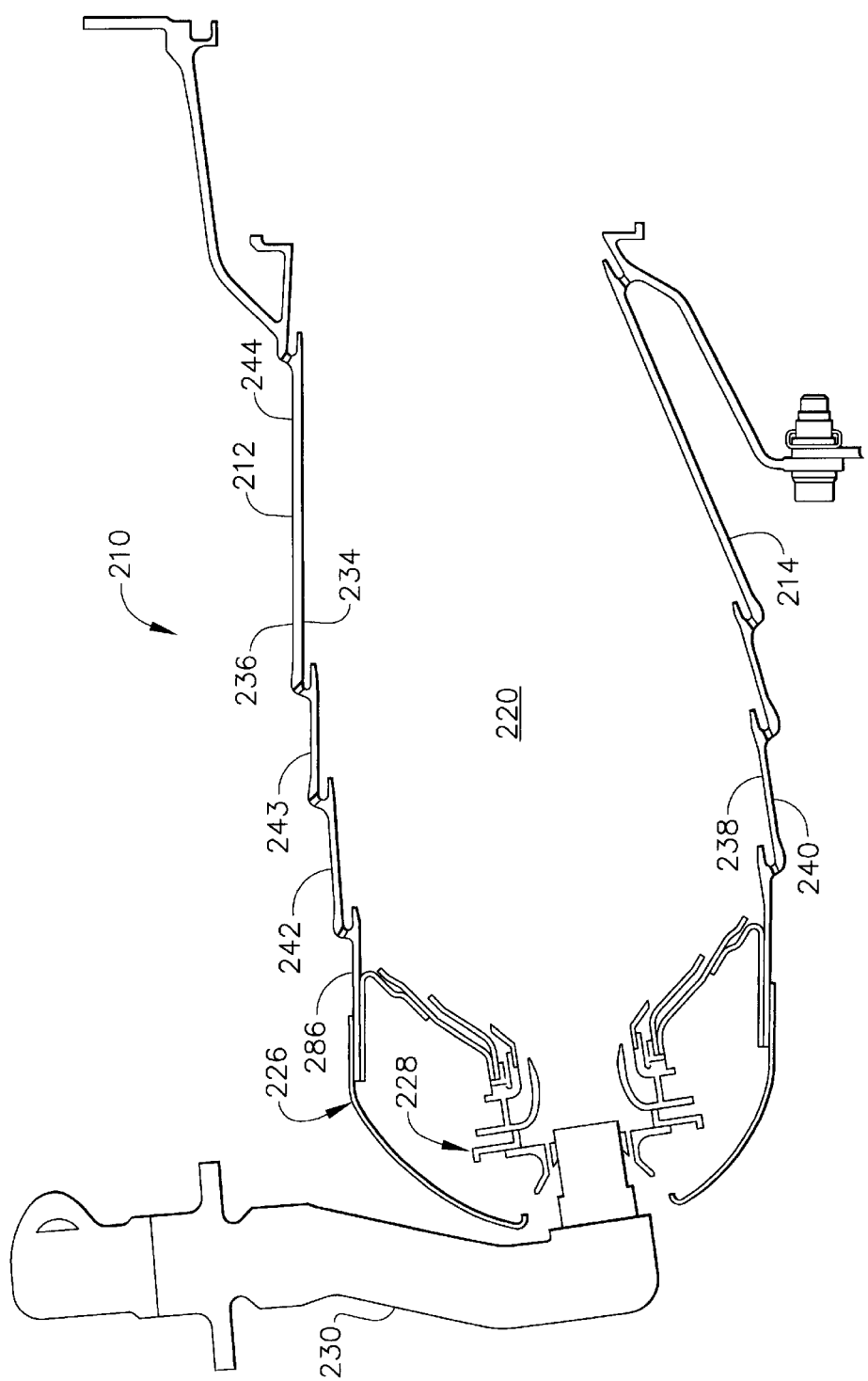
FIG. 4 is a longitudinal sectional view of a gas turbine combustor having a third embodiment of a hybrid film cooled combustor liner.

The configuration of the dome assembly can also affect hot spot formation on the combustor liners. For instance, it is generally desirable to provide wide angle domes because such flatter domes are believed to be cheaper and lighter than conventional domes, improve the durability of the splashplate in the swirler assembly, and may even reduce engine emissions. However, the flatter dome means that more of the liner adjacent to the dome assembly is exposed to the hot combustion gases such that conventional cooling of this area can be insufficient. FIG. 4 shows another embodiment that addresses this problem.

Specifically, FIG. 4 shows a combustor 210 that includes an annular outer liner 212 and an annular inner liner 214 that are radially spaced from each other to define a combustion chamber 220. A dome assembly 226 mounted at the upstream ends of the outer and inner liners 212 and 214 supports a plurality of circumferentially spaced swirler assemblies 228 (only one shown in FIG. 4). Each swirler assembly 228 receives compressed air from the compressor and fuel from a corresponding fuel nozzle 230. The fuel and air are swirled and mixed by the swirler assemblies 228, and the resulting fuel/air mixture is discharged into the combustion chamber 220. The fuel/air mixture is ignited by one or more igniters (not shown) that are disposed around the circumference of the outer liner 212. It is noted that although FIG. 4 illustrates a single annular combustor, the present invention is equally applicable to other types of combustors.

The outer and inner liners 212 and 214 each comprise a metal shell having a generally annular and axially extending configuration. The outer liner 212 has a hot side 234 facing the hot combustion gases in the combustion chamber 220 and a cold side 236 in contact with relatively cool air. Similarly, the inner liner 214 has a hot side 238 facing the hot combustion gases in the combustion chamber 220 and a cold side 240 in contact with relatively cool air.

The outer liner 212 includes a first panel section 242, a second panel section 243, and a third panel section 244, although it should be noted that the third embodiment is also not limited to such a three-panel configuration. The third panel section 244 can be, but is not necessarily, axially longer than either of the first and second panel sections 242, 243. The panel sections 242–244 are substantially similar to those of the first embodiment in that each panel section has a cooling nugget formed at the forward end thereof and each cooling nugget includes an annular lip formed thereon and spaced radially inward so as to define a cooling slot. A row of cooling holes is formed in each cooling nugget to feed cooling air to the cooling slots. The cooling slots are oriented in a substantially axial direction so that cooling air is directed downstream and forms a thin cooling film on the hot side of the corresponding panel sections. The outer liner 12 also has a similar cooling scheme in which the first and second panel sections 242, 243 are provided with slot film cooling and the third panel section 244 is provided with multi-hole film cooling. The panel sections 242–244 of the outer liner 212 are essentially the same as those in the outer liner 12 of the first embodiment, which are discussed in more detail above. Thus, the structure and cooling scheme of the panel sections 242–244 need not be described in further detail. Also, the configuration of the inner liner 214 is similar to the outer liner 212 and consequently is not described in detail here as the current description is essentially applicable to both liners.

The combustor 210 differs from the first embodiment in that the dome assembly 226 presents a wider angle dome so that more of the liner 212 closest to the dome assembly 226 is exposed to the hot combustion gases. The section 286 of the liner 212 forward of the first panel section 242 (which is sometimes referred to as the zero panel) is provided with multi-hole film cooling. In particular, the zero panel section 286 is covered with an array of closely packed multi-hole cooling holes (not shown in FIG. 4 but similar to the multi-hole cooling holes 80 shown in FIG. 2) extending therethrough. These multi-hole cooling holes are axially slanted from the cold side to the hot side at a downstream angle, which is preferably, but not necessarily, in the range of about 15° to 20°. Thus, the liner 212 has a first portion that is provided with slot film cooling, a second portion, aft of the first portion, that is provided with multi-hole film cooling, and a third portion, forward of the first portion, that is also provided with multi-hole cooling.

While specific embodiments of the present invention have been described, it will be apparent to those skilled in the art that various modifications thereto can be made without departing from the spirit and scope of the invention as defined in the appended claims.

What is claimed is:

1. A combustor liner comprising:
   a first annular panel section having a forward end and an aft end;
   a second annular panel section having a forward end and an aft end, said second panel section being joined at its forward end to said aft end of said first panel section; and
   a third annular panel section having a forward end and an aft end, said third panel section being joined at its forward end to said aft end of said second panel section, wherein at least one of said panel sections has an array of multi-hole film cooling holes formed therein, and at least one other of said panel sections has a cooling nugget including a film cooling slot disposed at said forward end thereof, and wherein said at least one other of said panel sections having a cooling nugget does not have multi-hole film cooling holes formed therein, and said at least one of said panel sections having said multi-hole film cooling holes formed therein does not have a cooling nugget.

2. The combustor liner of claim 1 wherein said first panel section is provided with an array of multi-hole film cooling holes formed therein and said second and third panel sections are provided with a cooling nugget including a film cooling slot disposed at said forward end thereof.

3. The combustor liner of claim 2 wherein said first panel section is axially longer than either of said second and third panel sections.

4. The combustor liner of claim 1 wherein said at least one panel section is provided with a first thermal barrier coating and said at least one other panel section is provided with a second thermal barrier coating.

5. The combustor liner of claim 4 wherein said first thermal barrier coating is a thick, dense, vertically microcracked thermal barrier coating.

6. The combustor liner of claim 5 wherein said second thermal barrier coating is a porous thermal barrier coating.

7. A combustor liner comprising:
   a first annular panel section having a forward end and an aft end;
   a second annular panel section having a forward end and an aft end, said second panel section being joined at its forward end to said aft end of said first panel section; and
   a third annular panel section having a forward end and an aft end, said third panel section being joined at its forward end to said aft end of said second panel section, wherein each of said first, second and third panel sections have a cooling nugget including a film cooling slot disposed at said forward end thereof, and further wherein said third panel section has an array of multi-hole film cooling holes formed therein, and is axially longer than said first and second panel sections which do not have multi-hole film cooling holes formed therein.

8. The combustor liner of claim 6 further comprising:
   a first group of dilution holes formed in said second panel section; and
   a second group of dilution holes formed in said third panel section.

* * * * *